Dec. 30, 1969  R. D. KINDORF ET AL  3,486,726
UNIVERSAL PIPE CLAMP

Filed July 9, 1968  2 Sheets-Sheet 1

INVENTORS
ROBERT D. KINDORF
DAVID O. KINDORF

BY Fryer Tjensvold Feix Phillips & Lempio
ATTORNEYS

Dec. 30, 1969  R. D. KINDORF ET AL  3,486,726
UNIVERSAL PIPE CLAMP

Filed July 9, 1968  2 Sheets-Sheet 2

INVENTORS
ROBERT D. KINDORF
DAVID O. KINDORF

BY
ATTORNEYS

United States Patent Office 3,486,726
Patented Dec. 30, 1969

3,486,726
UNIVERSAL PIPE CLAMP
Robert D. Kindorf, 448 Scenic Ave., Piedmont, Calif. 94611, and David O. Kindorf, 6257 Girvin Drive, Oakland, Calif. 94611
Filed July 9, 1968, Ser. No. 743,517
Int. Cl. F16l 3/24; A47b 96/06
U.S. Cl. 248—72
3 Claims

ABSTRACT OF THE DISCLOSURE

A pipe clamp of the type used to secure a pipe or conduit against a beam of channel-shaped cross section. The legs of the beam having inwardly turned flanges adapted to be engaged by parts of the pipe clamp. The flange engaging parts of the present clamp are designed to function properly with two very popular kinds of channel-shaped beams which have distinctly different cross sectional configurations. They are also designed for greater strength than conventional clamps so it is possible to make them of lighter and less costly material.

There are two types of channels most generally used and each includes a channel-shaped section with inwardly turned edges or flanges on the legs. Manufacturers provide pipe securing clamps of various designs with parts engaging behind these flanges. However, since the two leading types of channels have flanges of different configuration, each requires a different type of clamp and the clamps are not interchangeable. The present invention provides a clamp that is interchangeable. There are presently millions of feet of each type of channel in service where it is contemplated that additional installations of pipe are to be made. Often, installations made at different times will have the two different types of supporting channels and a contractor engaged in the installation of more pipe will need two types of clamps for each size pipe unless provided with a universal type of pipe clamp which will work equally well on either of the two types of channels.

The present invention provides such a pipe clamp and the objects and advantages of the invention as well as the manner in which it is carried into practice will be made apparent in the following specification wherein the invention is described in detail by reference to the accompanying drawings.

Figure 1:
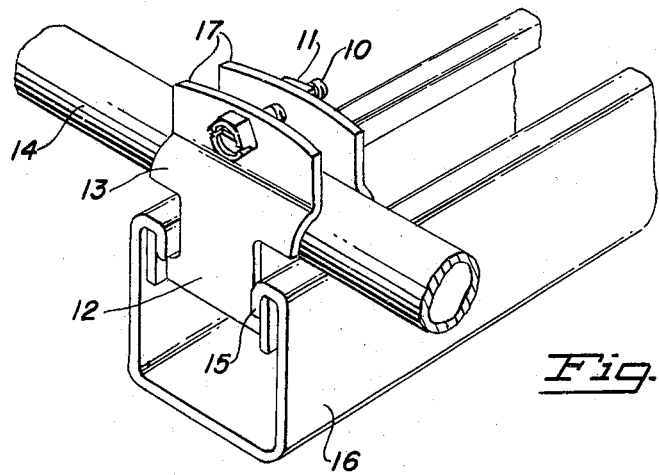
FIG. 1 is a perspective view of a pipe clamp embodying the present invention showing the same installed and securing a piece of pipe against a conventional channel-shaped beam.

In FIG. 1 of the drawing, a pipe clamp constructed in accordance with the present invention is shown as having two parts secured together as by a screw 10 and nut 11, and each part has a relatively straight leg portion 12 and a part 13 curved to embrace a pipe shown at 14. At the lower end, the leg portion 12 has members presently to be described in detail for engaging beneath the flanges 15 of a channel-shaped supporting member 16. The screw 10 passes through tabs 17 which extend upwardly from the curved portion 13 so that upon tightening of the nut thereon, the pipe is securely clamped and the lower ends are drawn upwardly into firm engagement with the flanges of the channel so that rigid connection is made between the pipe and channel. The pipe may be disposed horizontally as shown on top of a horizontal channel or if the channel is inverted, the pipe can be suspended or even secured to the side of a vertically disposed channel.

Figure 2:
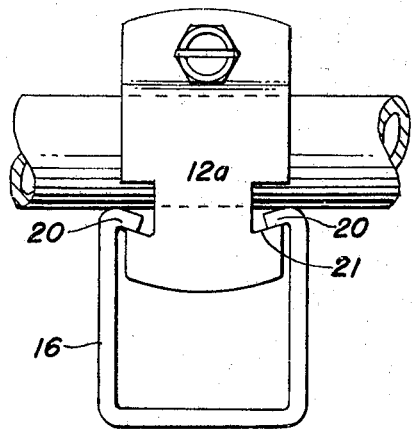
FIGS. 2 and 3 are views in end elevation showing two common types of channels and two pipe clamps known to the prior art for clamping pipes to such channels.
Figure 3:
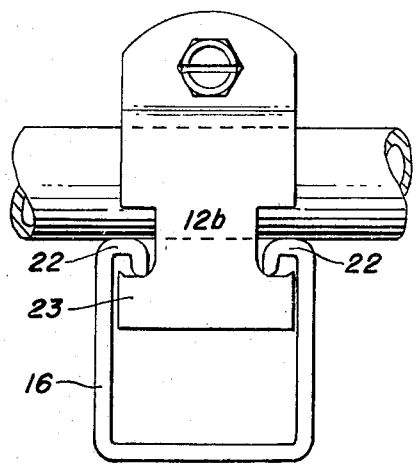

FIGS. 2 and 3 of the drawing illustrate the cross-sectional configuration of two most commonly used pipe supporting channels and show typical clamps which are used with the channels. The channel of FIG. 2 has flanges 20 which extend inwardly and at a slight angle toward the back of the channel. The straight leg portion 12a of the clamp shown in FIG. 2 is notched on opposite sides to form lugs 21 which engage beneath the flanges of the channel. The other popular type of channel is shown in FIG. 3 as having flanges 22 which extend inwardly and then downwardly or toward the back of the channel and the straight portion of the clamp shown at 12b has notched edges to provide lugs 23 engaging beneath the flanges. Examination of these two types of channels and clamps shows that they are not interchangeable. The clamp of FIG. 2, if engaged beneath the flanges of FIG. 3 would be disposed in a much lower position so that its two parts could not be drawn together to embrace the pipe. The reverse situation is true if the clamp of FIG. 3 is assembled in the channel of FIG. 2 where the clamp would be disposed in a higher position so that the tabs through which the screw is inserted would come together and prevent tightening of the clamp parts about the pipe.

Figure 4:
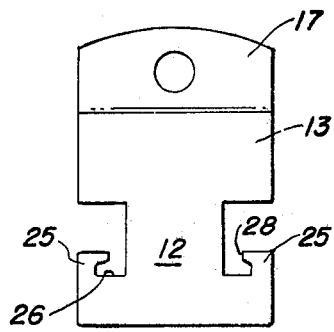
FIG. 4 is a view in elevation of one part of the clamp of the present invention before it is completely formed.
Figure 6:
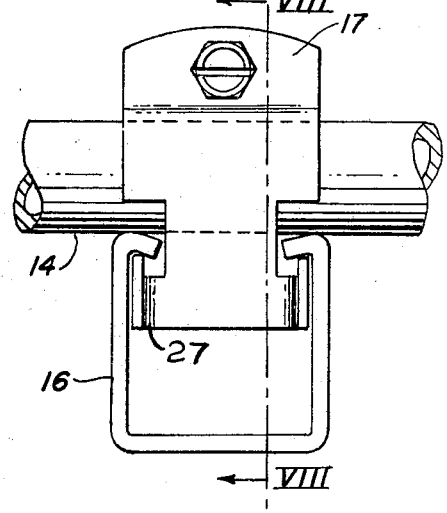
FIG. 6 is a view in elevation showing the clamp associated with the beam of the type illustrated in FIG. 2.
Figure 5:
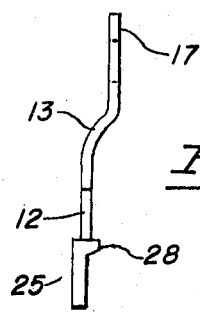
FIG. 5 is a view in elevation at right angles to FIG. 4 of one-half of the clamp after it has been completed.
Figure 7:
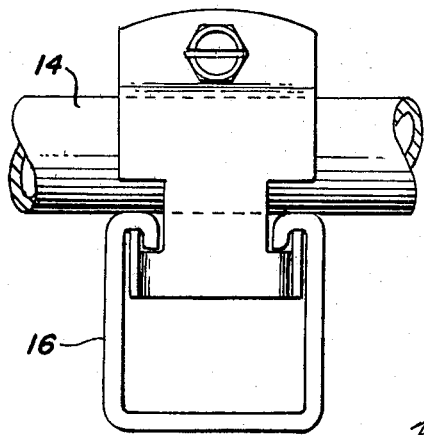
FIG. 7 is a similar view showing the same clamp associated with the beam of the type shown in FIG. 3.
Figure 8:
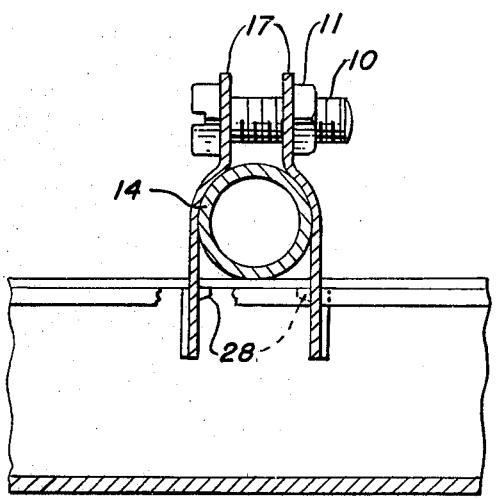
FIG. 8 is a sectional view taken on the line VIII—VIII of FIG. 6 with parts broken away.

The configuration of the clamp of the present application is best shown in FIGS. 4 and 5 and the manner in which it is used with both types of channels is clearly illustrated in FIGS. 7 and 8. One of the two clamp parts is shown in elevation in FIG. 4 where it is seen as having the straight portion 12, the curved portion 13 and the tabs 17 as in FIG. 1, and where it is also shown as having notches in its two edges forming upstanding lugs 25. In the finished product, however, the lugs 25 are bent at right angles to the flat portion 12 of the clamp, the flat portion also being bent as indicated at 27 in FIG. 6 so that the lugs assume the position illustrated in FIG. 5. This creates a double bend in the metal which gives rigidity to an area which might otherwise prove weak. Since these lugs are disposed parallel to the walls of the channel, and notches are cut downwardly of the lugs as best shown at 26 in FIG. 4, the top edges of the lugs fit both types of channels as shown in FIGS. 6 and 7 by engaging beneath the flanges and without interfering with the innermost portions of the flanges. Consequently, the position of the entire clamp when it is assembled with the channel and pipe is substantially identical for both types of channels.

When the notches are cut, they extend under the lugs 25 which engage beneath the flanges of the channel. This provides inwardly directed projections shown at 28 in FIG. 4. The bend in the metal is such that the top edge of the lug projects equally from opposite sides of the straight portion 12 in engaging beneath the flange of the channel, as is most clearly shown in FIG. 8. Consequently, the upward pull on the portion 12 which occurs when the nut is tightened on the screw will exert pressure equally on opposite sides of the clamp element, thus avoiding the tendency for it to tip in one direction or the other.

What is claimed is:

1. A pipe clamp for use with a pipe supporting channel of the type which has inwardly supporting flanges defining a longitudinally extending slot between the ends of its legs, the clamp comprising two metal straps each with an end to extend through said slot and notched to provide a lug to extend under each flange, a part of each lug being disposed at a right angle to the plane of the end of the strap and positioned for engagement behind the flange closely adjacent and parallel to a leg of the channel, each strap having its opposite end extending away from the channel to embrace a pipe, and adjustable means to draw said opposite ends toward each other.

2. The pipe clamp of claim 1 in which the notches in the straps extend inwardly of the channel sufficiently to avoid contact with the flanges except in the area recited.

3. The pipe clamp of claim 1 in which notches extend under the channel engaging edges of the lugs, and the lugs are bent toward their right angular positions on lines which cause the channel engaging edges to extend in two directions from the plane of the strap.

References Cited

UNITED STATES PATENTS

| | | | |
|---|---|---|---|
| 2,674,431 | 4/1954 | Attwood | 248—243 |
| 2,863,625 | 12/1958 | Attwood | 248—73 X |
| 3,370,815 | 2/1968 | Opperthauser | 248—68 X |

CHANCELLOR E. HARRIS, Primary Examiner

U.S. Cl. X.R.

24—73.7; 248—228